United States Patent [19]

Tanaka et al.

[11] Patent Number: 4,965,904
[45] Date of Patent: Oct. 30, 1990

[54] CONTACT LENS CLEANING DEVICE

[75] Inventors: Toyoyasu Tanaka, Nagoya; Yasuyoshi Yamamoto, Komaki; Yuzou Kaga, Nagoya, all of Japan

[73] Assignee: Menicon Co., Ltd., Nagoya, Japan

[21] Appl. No.: 431,955

[22] Filed: Nov. 6, 1989

[30] Foreign Application Priority Data

Nov. 9, 1988 [JP] Japan .................. 63-146049

[51] Int. Cl.[5] .......................... A47L 1/02; B08B 3/00
[52] U.S. Cl. ................... 15/97.1; 134/184; 134/901; 15/104.94; 15/214
[58] Field of Search ................. 15/97 R, 104.94, 214; 134/184, 901; 206/5.1

[56] References Cited

U.S. PATENT DOCUMENTS

| | | | |
|---|---|---|---|
| 3,139,097 | 6/1964 | Hungerford et al. | 134/145 |
| 3,614,959 | 10/1971 | Schollmaier et al. | 134/901 |
| 4,187,574 | 2/1980 | Wrue | 15/104.82 |
| 4,559,662 | 12/1985 | Kusold | 15/97 R |
| 4,691,725 | 9/1987 | Parisi | 134/184 |
| 4,840,681 | 6/1989 | Pompe | 134/42 |

Primary Examiner—Henry J. Recla
Assistant Examiner—David Walczak
Attorney, Agent, or Firm—Armstrong, Nikaido, Marmelstein, Kubovcik & Murray

[57] ABSTRACT

A contact lens cleaning device comprising a ball, a vessel formed with a recessed chamber for housing the lens and the ball, and a vibrator for vibrating the vessel. The chamber has a bottom concave surface so curved that the lens is mounted in face-to-face contact thereon. After the lens is sandwiched between the bottom concave surface of the chamber, the ball is cleaned when the vessel is vibrated by the vibrator.

3 Claims, 4 Drawing Sheets

CONTACT LENS CLEANING DEVICE

BACKGROUND OF INVENTION

The present invention relates to a contact lens cleaning device.

A contact lens (hereinafter referred to as "lens") has been hitherto manually cleaned by means of fingers, a puff (like a powder puff) or the like.

However, in such manual working, the lens is easily damaged due to mistake of handling. In addition, there is disadvantage that the manual cleaning requires a lot of time.

The main object of the present invention is to delete the above-mentioned disadvantages and to provide a cleaning device which can automatically clean a lens for a short time, and further, which can clean both side surfaces of the lens at the same time.

SUMMARY OF THE INVENTION

The cleaning device of the present invention comprises (a) a cleaning ball for cleaning a lens, (b) a cleaning vessel formed with a recessed cleaning chamber for housing the lens and the cleaning ball on a bottom concave surface thereof which is formed as a curved surface so that the lens is mounted in face-to-face contact, and (c) a vibrator for vibrating the cleaning vessel.

When the cleaning device is used, firstly a lens and the cleaning ball are inserted in the cleaning vessel. Further, cleaning medium is poured, and the vibrator is operated. Then, since the cleaning vessel vibrates and the cleaning ball also vibrates, both outside (convex side) and inside (concave side) surfaces of the lens are rubbed with the bottom concave surface of the cleaning chamber and the cleaning ball, and the lens is cleaned.

Hereinafter embodiments of the device of the present invention are explained with reference to the accompanying drawings.

DETAILED DESCRIPTION

Figure 1:
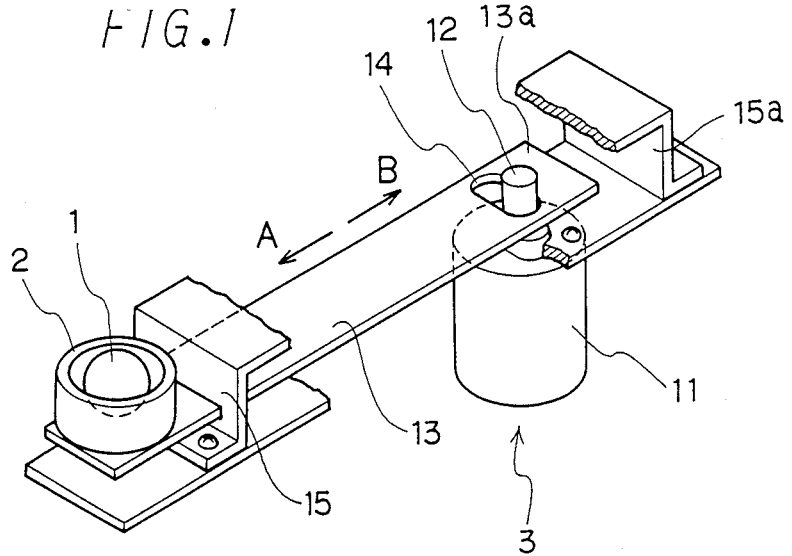
FIG. 1 is a perspective view showing an embodiment of the cleaning device of the present invention.
Figure 2:
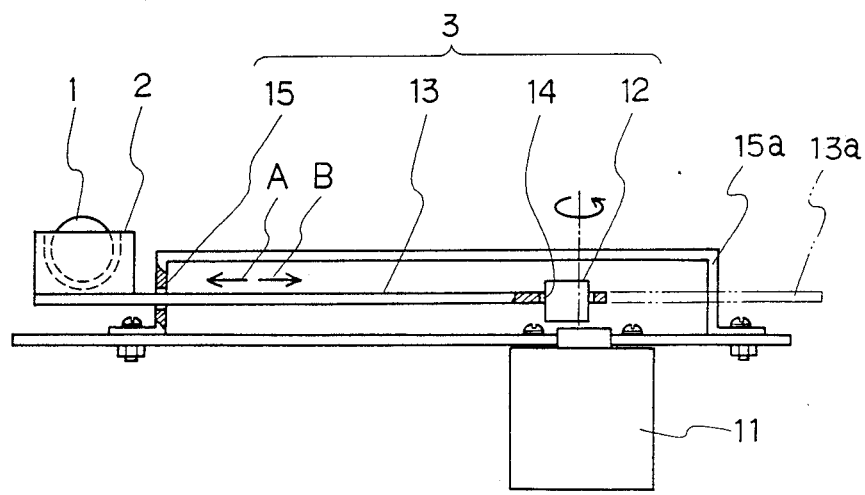
FIG. 2 is a side elevational view showing the device of FIG. 1.

Referring to FIGS. 1 and 2, the numeral 1 means a cleaning ball, the numeral 2 means a cleaning vessel and the numeral 3 means a vibrator. The cleaning ball 1 is preferably formed as a spherical body. However, a slightly depressed ball having an ellipsoidal shape can be employed. The diameter of the ball is 5 through 15 mm, preferably 8 through 12 mm, in accordance with diameter of the lens to be cleaned.

Though material of the ball is not limited, for example, glass or plastics (for soft contact lens) and rubber or forming material (for hard contact lens) can be employed in accordance with the type (soft or hard contact lens) and hardness of the lens. When light material is used for the ball 1, it is preferable to embed a weight in the ball.

Figure 5:
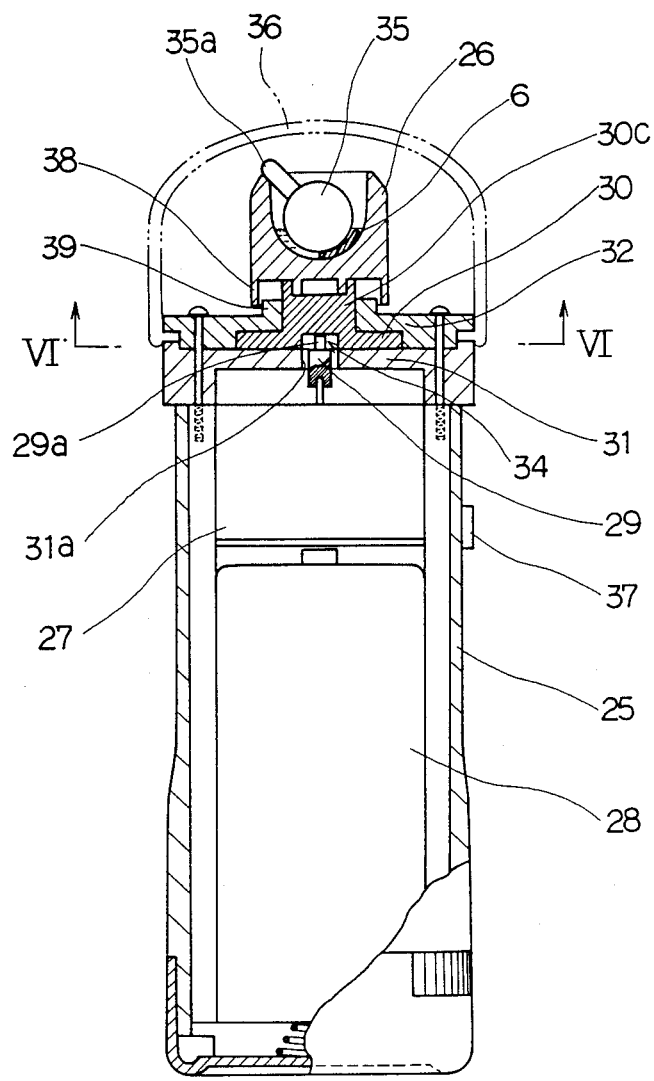
FIG. 5 is a partially cutaway elevational view showing another embodiment of the device of the present invention.

As shown in FIG. 5, when a cleaning ball 35 is provided with a stem 35a, the ball 35 can be conveniently handled. When the stem 35a is provided on the ball 35, at least lower surface of the ball 35 is required to be spherical, and the upper surface can be made as a flat surface or the like. The words "cleaning ball" in the instant specification includes a body having such shape.

Figure 3:
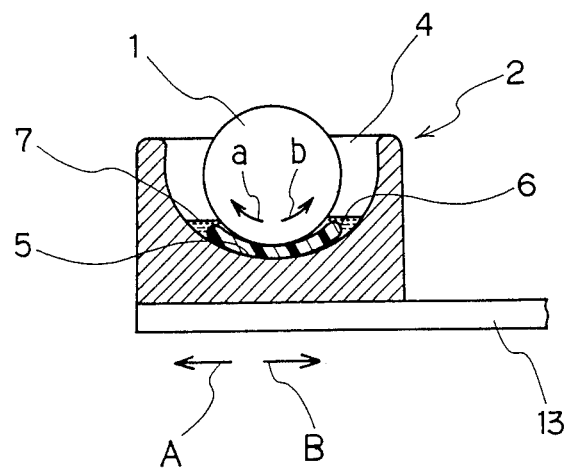
FIG. 3 is a sectional view showing a cleaning vessel of the device of FIG. 1.

The cleaning vessel 2 is a vessel to house a lens and the cleaning ball 1 in order to clean the lens. The cleaning vessel 2 is formed with a recessed cleaning chamber 4, as shown in FIG. 3, and the bottom surface 5 of the chamber 4 is formed into a concave surface so as to obtain a face-to-face contact with the lens. Material of the cleaning vessel 2 is not particularly limited, and synthesized resin such as heat plastic material or the like can be employed.

As shown in FIG. 3, in a preferable case, the volume of the cleaning chamber 4 is slightly larger than the cleaning ball 1 so as to control bound or large rolling of the cleaning ball 1. Further, in such a device, even though the cleaning ball has a stem (35a as shown in FIG. 5), the stem 35a can be prevented from dropping into the cleaning chamber 4 since the stem 35a is engaged with the upper edge of the cleaning vessel 2.

With respect to the vibrator 3, though any type of vibrator can be employed without limitation, vibrators having about 2 to 8 mm in vibration stroke and about 500 to 1000 cycle/min in number of vibration are preferably employed.

The vibrator shown in FIGS. 1 and 2 is constructed as mentioned hereinafter.

The numeral 11 means an electric motor having an output shaft on which an eccentric shaft 12 is fixed. A vibrating plate 13 has an elongated hole 14 at a base portion 13a thereof, and the above-mentioned eccentric shaft 12 is inserted through the elongated hole 14. Further the vibrating plate 13 is guided by a guide member 15 so that the vibrating plate 13 moves linearly in the longitudinal direction thereof which is almost perpendicular with the direction of the elongated hole 14. Therefore, when the motor 11 rotates, the vibrating plate 13 reciprocally moves in the directions shown by arrows A and B to vibrate the cleaning vessel 2.

The base portion 13a of the vibrating plate 13 can be guided with another supporting plate 15a in FIGS. 1 and 2.

Hereinafter, a cleaning method using the above-mentioned device is explained.

Referring to FIG. 3, firstly, a lens 6 and a cleaning ball 1 are inserted into a cleaning chamber 4 in this order, and further, cleaning medium (liquid) 7 is poured therein. As the cleaning medium, cleaning solution for contact lens is preferably used. Further, abrasive solution (solution including abrasive) can be used. Amount of the medium to be used is generally 0.1 to 1.0 cc.

After the device is prepared as mentioned above, the electric motor 11 is started to vibrate the cleaning vessel 2. Then, the lens 6 vibrates in the directions of arrow a and b, and the cleaning ball 2 also vibrates on the lens 6. Therefore, both outside and inside surfaces are cleaned at the same time. The cleaning ball 2 has a function as a weight for controlling bound of the lens and as a mass element for providing relative motion between the cleaning chamber and the lens and between the lens and the ball during the vibration.

When using abrasive solution instead of the cleaning solution, a lens having slight flaws can be polished to a smooth lens surfaces. Under a normal condition, it is sufficient to clean for 30 to 60 seconds.

Figure 4:
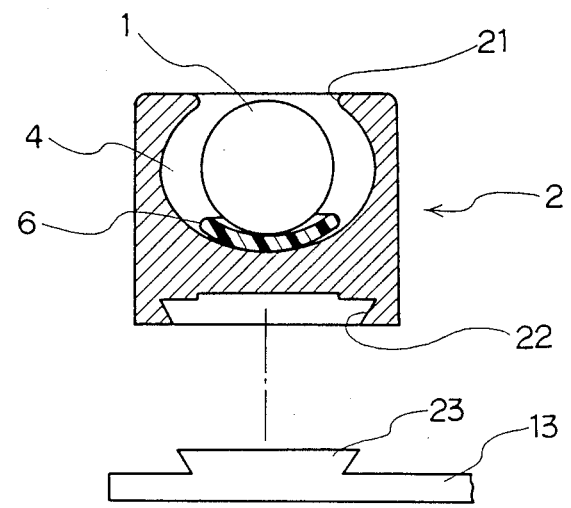
FIG. 4 is a sectional view showing another embodiment of a cleaning vessel in the device of the present invention.

In FIG. 4, another embodiment of the cleaning vessel in the present invention is shown. The vessel 2 has an upper end projecting inwardly in the radial direction. When the vessel 2 is used, the cleaning solution does not hop out of the vessel 2. Further, the vessel 2 is provided with a dovetail groove 22 capable of receiving a dovetail tenon 23 of a vibrating plate 13. In that case, the cleaning vessel 2 is detachably mounted on the vibrating plate 13.

Figure 6:
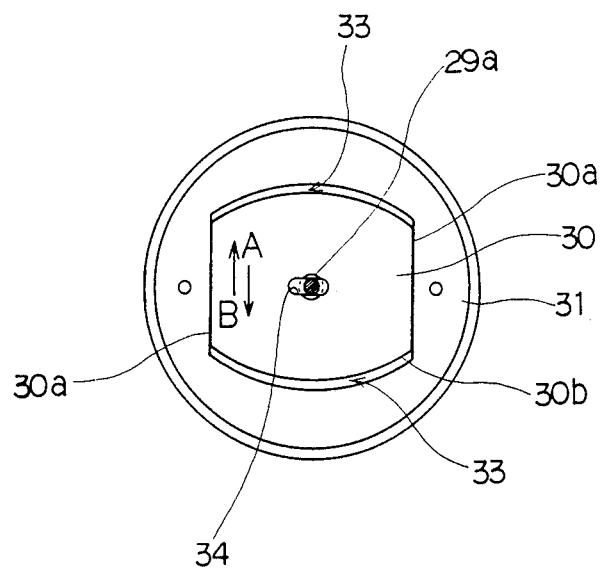
FIG. 6 is a sectional view obtained along lines VI—VI in FIG. 5.

The cleaning device shown in FIGS. 5 and 6 has a tubular case 25 and a cleaning vessel 26 provided on the case 25. An electric motor 27 and an electric cell or battery 28 are housed in the case 25 in alignment with the cleaning vessel 26.

In the device, a vibrator is constructed by an eccentric shaft 29 fixed on the output shaft (rotary shaft) of the electric motor 27, a vibrating plate 30 and a set of plate 31 and guide holder 32 for linearly guiding the vibrating plate 30.

The vibrating plate 30 is sandwiched between the plate 31 and guide holder 32 from the lower and upper sides in slidable manner, and lateral linear edges (30a in FIG. 6) are guided with inside surfaces of the guide holder 32. Therefore, vertical and lateral motions of the vibrating plate 30 are restrained. As shown in FIG. 6, there is an arc-shaped gap 33 larger than the stroke of the vibrating plate 30 between the inside face of the guide holder 32 and arc-shaped portions 30b of the vibrating plate 30.

In addition, an elongated hole or groove 34 extending in a direction almost perpendicular with the guide surfaces 30a is formed in the lower side surface (underside surface) of the vibrating plate 30, and an end 29a of the eccentric shaft 29 passing through a center hole 31a of the plate 31 is loosely engaged with the groove 34.

Therefore, when the electric motor 27 rotates, the vibrating plate 30 linearly vibrates in the horizontal direction of arrows A and B in FIG. 6. Under a particular condition the cleaning ball 35 and the lens 6 rotate around a vertical axis. Then all of the surface of the lens 6 can be finely polished.

The above-mentioned vibrating plate 30 is provided with a shaft portion 30c projecting upwardly, and the lower portion of the cleaning vessel 26 is detachably supported on the shaft portion by means of elastic engagement or the like. Therefore, the vessel 26 itself can be easily cleaned.

In the device of FIG. 5, a cover 36, for example, made of transparent resin is detachably mounted on the upper portion of the tubular case 25, and an ON-OFF switch 37 is provided on the case 25. Further, a skirt portion 38 and a ring-like wall 39 for preventing invasion of dust are provided on the cleaning vessel 26 and the guide holder 32, respectively.

The above-mentioned cleaning device of FIGS. 5 and 6 can be compactly constructed since the cleaning vessel 26, the motor 27 and the cell 28 are aligned on a straight line. Therefor, the device is conveniently handled to carry.

Though a type of vibrator in which rotation is mechanically converted into linear motion is explained hereinbefore, another type of vibrators of course can be employed in the present invention. For example, a vibrator comprising an electric motor having a mass element fixed to a rotary shaft thereof or that using electromagnet can be employed in the device of the present invention. Further, direction of vibration is not limited in the present invention. For example, vertical vibration, reciprocal rotation and the like can be employed.

The cleaning device of the present invention can be used not only for soft contact lens, but also for hard contact lens. However, the device of the present invention is preferably used for a soft contact lens. Further, the cleaning device can be personally used, and can be used as a device to be equipped in a manufacturing line in a factory. For personal use, it is sufficient to provide single cleaning vessel (or a pair of vessels for both eyes) in the device. When the device is equipped in a manufacturing line, a lot of vessels are preferably attached.

By utilizing the cleaning device of the present invention, a contact lens can be easily and automatically cleaned for a short time. Further, both surfaces of the lens can be cleaned at the same time.

Though several embodiments of the invention are described above, it is to be understood that the present invention is not limited to the above-mentioned embodiments, and various changes and modifications may be made in the invention without departing from the spirit and scope thereof.

WHAT WE CLAIMED IS:

1. A contact lens cleaning device comprising:
   (a) a cleaning ball;
   (b) a cleaning vessel formed with a recessed cleaning chamber adapted to removably receive the cleaning ball with a contact lens between the cleaning chamber and cleaning ball; said cleaning chamber comprising a bottom concave surface which is curved complimentarily to the curvature of the lens and ball so that the lens can be mounted in face-to-face contact therebetween; and
   (c) a vibrator connected to said cleaning vessel for vibrating the cleaning vessel.

2. The device of claim 1 wherein said cleaning ball is provided with a stem.

3. The device of claim 1 wherein said vibrator comprises an electric motor having an output shaft; an eccentric shaft fixed to said output shaft of the electric motor; and a vibrating plate operationally connected with the eccentric shaft; and said cleaning vessel is detachably supported on said vibrating plate.

* * * * *